Dec. 21, 1926.  
S. L. ROGERS  
1,611,378  
VELOCIPEDE DRIVE  
Filed Oct. 6 1923

INVENTOR.  
Samuel L. Rogers  
BY Julien A. Bened  
HIS ATTORNEY.

Patented Dec. 21, 1926.

1,611,378

UNITED STATES PATENT OFFICE.

SAMUEL L. ROGERS, OF SAN FRANCISCO, CALIFORNIA, ASSIGNOR TO JULIEN A. BRIED, OF OAKLAND, CALIFORNIA.

VELOCIPEDE DRIVE.

Application filed October 6, 1923. Serial No. 666,979.

My invention relates to velocipedes particularly of the type which are propelled by foot power of a rider while standing upright thereon, tho it may be used with other type of velocipedes.

The invention has for its principal objects the improvement of this type of vehicle and a simplification of the treadle drive for actuating the road wheels together with other improvements all contributing to a better and safer vehicle of this class.

My invention is illustrated in the drawings accompanying this application and wherein Fig. 1 is a side elevation of my complete vehicle with near rear wheel and side of the body omitted to reveal the driving mechanism. The vehicle is shown with one treadle depressed with a rider's foot dotted in position on it, and the other treadle broken with its rear end in raised position.

Fig. 2 is a plan view of the rear portion of the velocipede taken along the line 2—2 of Fig. 1, but with the drive chain omitted, both treadles depressed, and with one treadle chain hook also omitted for clarity of the drawing.

Fig. 3 is an enlarged detail of an optional spring connection from the rear end of a treadle to the chain hook. Fig. 4 is an enlarged detail showing how the chain hooks pass one another on a common bicycle chain. Fig. 5 is a side view of Fig. 4 looking in the direction of the arrows 5—5 of Fig. 4. Figures 6 and 7 are modified sprocket chains for use with the vehicle, a hook being shown on the off side of Fig. 6 engaging the chain.

Figure 1:
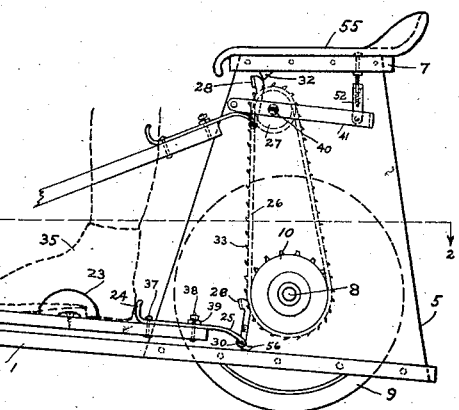
Figure 2:
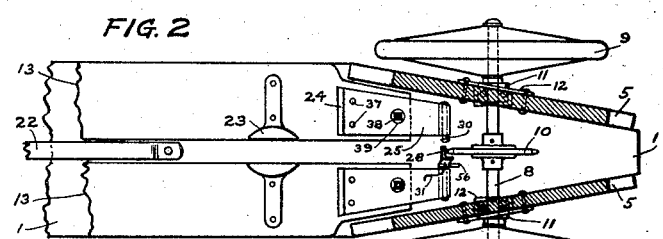

In further detail the vehicle is shown in Figures 1 and 2 to consist of a lower frame 1 with a bracket 2 at its forward end pivotally connected to a steering post 3 carrying at its lower end a front wheel 4. The rear end of the frame has two sides 5 connected by a wedge shaped top piece 7, on top of which is secured a seat 55 shaped for the rider to sit upon, as the vehicle may also be propelled from a sitting posture if desired.

The sides of the body diverge forwardly and are open front and back (as shown in Figure 2). This form accomplishes several things, makes the mechanism accessible at the front end for oiling, permits of a wide treadle at the rear end for strength, guards the forward rims of the road wheels, and has lateral stiffening structural advantages.

Through the sides 5—5 extends a rear shaft 8 to which are secured driving road wheels 9—9, one of which may be left loose on the shaft in the usual manner, or both may drive.

On the shaft 8 is centrally secured a driving sprocket 10, and the shaft is supported for rotation in the vehicle sides by passing through ball bearings as indicated at 11—11 positioned in special angle brackets 12 secured to the diverging sides, the brackets serving to align the bearings.

Two operating treadle boards are shown at 13, the treadles having each at their forward ends a metal bracket 14 extending upwardly and transversely pivoted at 15 to the frame 2. At 16 is a double spring of wire wound around a projection 17 on the frame bracket with its free ends 19 bearing, each respectively, against the under side of a treadle bracket to lift the rear ends of the treadles.

The treadles are stopped in their downward motion by a stop 20 near the forward ends, and in their upward movement by a stop 21 secured to the bracket brace 22 and extending laterally both ways.

The stops being close to the forward end where the motion is slight, do away with the noise otherwise generated in operation of the vehicle.

At 23 on the treadles is shown a curved plate to fit against the side of the arch of the shoe so that a child can hold the feet against them and thereby avoid slipping off. At 24 is shown a further stop for the heel formed on the hook attaching plate 25, its object being to prevent the feet from slipping back into the mechanism.

The driving mechanism consists of an endless sprocket chain 26 (preferably of special design) passing around the drive sprocket 10 secured to the rear axle 8, then up and over an idler sprocket or wheel 27, and a pair of special hooks 28 pivoted at 30 to the treadles, are suitably formed and arranged to catch the chain links upon downward movement of the treadles only.

The hooks are rather loose on their pivots 30 and are held against the chain sidewise, also pressed edgewise toward the chain by small springs 31. The engaging ends of the hooks are offset and adapted to ride over each other as indicated in Figures 4 and 5, so that the treadles can pass one another on the upward stroke of either, and each independently hook the chain on the downward strokes.

The hooks are out of engagement with the chain on the upward stroke and entirely clear of the chain at the ends of the stroke, preferably being held out at either or both ends of the stroke by a deflecting bumper as indicated at 32 at the upper end, or by bumping the outwardly turned lower end of the hook 56 against the base board at the lower end of the stroke, or any other equivalent arrangement.

Figures 4, 5:
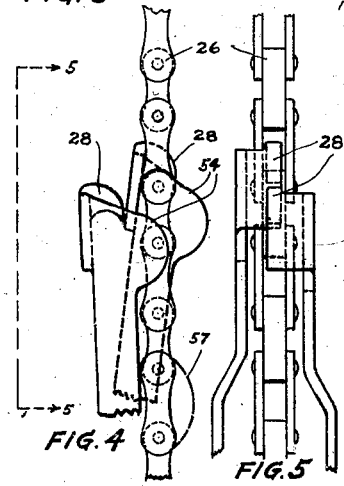
Figures 6, 7:
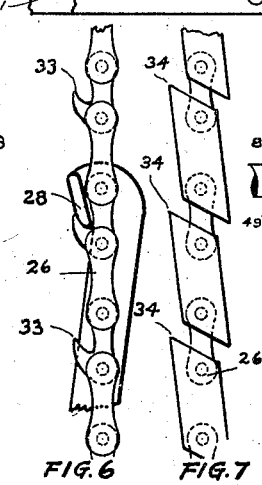

While the hooks shown in Figures 4 and 5 will engage a standard bicycle chain, the exact form of the hook depends on the style of chain used and a somewhat better acting hook may be devised if a special chain such as indicated in Figures 6 or 7 is used, as the hook does not then extend over a sprocket tooth space and can therefore pass clear over the sprockets without being thrown out by the teeth thereof. The chain shown in Fig. 6 having one (or more) teeth 33 formed on each of its inner block links, and the design in Fig. 7 having the outer side links cut at an angle to form engaging teeth 34, I wish to state should be considered as mere details of Fig. 1, tho the chain shown in Fig. 6 is my preferred form, but of course would be more expensive than standard chain as shown in Fig. 4 unless made in a very large quantity.

In the case of ordinary chain the upper idler 27 may be a simple idler wheel without teeth so that the hook can get down under the ends of the block links or chain rollers without first having to descend to pass the idler, and if the side links of the chain are widened one way as indicated at 57 in Fig. 4 they will overlap the sides of the idler if made the thickness of the space between them, and thereby avoid the use of flanges to the idler and consequent interferences of hooks such as shown in Fig. 4 with any such flanges.

Figures 3, 11:
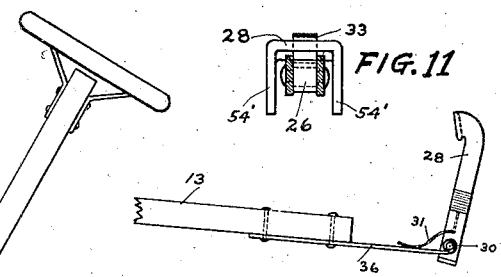
Figure 11 is a section showing the upper part of a hook of the type shown in Figure 6 but with both sides embracing the chain.

The hooks are preferably formed out of sheet metal and so arranged as shown in Figs. 6 and 4 that a flat portion, or extension thereof 54 lies against the side of the chain to guide the hook, and being held against it by the spring 31 shown in Figures 2 and 3, and which also presses the hooks in direction to engage the chain.

When one treadle only is used on the vehicle, or when a separate chain is used for each treadle, the hooks do not have to pass one another on the same strand of chain and in which case I prefer to make both sides of the hook embrace the chain as indicated in Figure 11 at 54' and which arrangement insures a more complete guiding of the chain.

To prevent too great a shock upon engagement of the hooks with the chain I preferably pivot the hooks each on a suitable resilient member, shown in Fig. 3 as a common flat spring 36 secured to and projecting from the rear end of the treadle 13. The spring is stiff enough to transmit the power, yet at the same time yield to the initial force of the impact.

In Fig. 1 a somewhat different arrangement is used, the hook 28 being pivoted to a stiff plate 25 loosely riveted at 37 to the treadles and further sustained by a very loose rivet or bolt 38 near the end of the treadle. The bolt has a spring split washer 39 interposed between its nut and the plate, thus adapting the remote end of the plate to yield upon impact until limited by the adjustment of the bolt.

It will be seen from the above explanation of the drive, that I employ but one driving chain with both treadle hooks working on the same chain strand without interference. This is a very important feature in economy of construction, but it is apparent that each hook could work on an individual chain, but this would require double the amount of chain, sprockets, etc. and greatly increase the cost, tho the invention is not limited to the use of but one chain nor to two treadles as it is equally apparent that one treadle could be omitted, tho the efficiency of the drive would also be impaired thereby.

Figure 10:
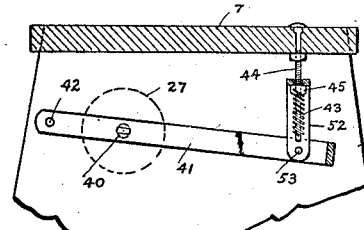
Fig. 10 is an enlarged detail of the upper idler automatic chain take up.

It is desirable that the idler 27 should be adjustable for keeping the chain taut so it will not jump the sprocket, and further desirable that the adjustment be automatic so as to take up all slack in the chain as it occurs. This I accomplish by the arrangement shown in Fig. 10 an enlarged broken sectional view of the upper part of the body showing the idler 27 carried on a shaft 40 held from revolving by squared ends in a pair of arms 41 joined at the rear end and pivoted at the forward ends to the sides of the vehicle at 42. The rear end of the arms is forced upward by the action of a spring 43 arranged about a stationary bolt 44 projecting downwardly from the top 7, the spring being secured at its upper end to a nut 45 threaded to the bolt and at the lower end being secured through a hole in the bolt. The spring is wound up before securing so that it will always tend to screw up the nut 45 against the top of the link 52 which pivotally suspends the joined ends of the arms 41 through pivots 53. It will be seen from the above explanation that whenever the chain stretches the device will automatically force the arms upward to take it.

Figure 9:
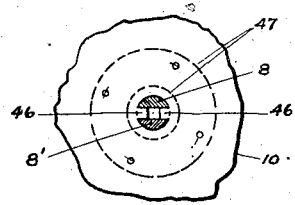
Figures 8 and 9 are slightly enlarged details of the divided rear shaft keyed in the rear sprocket.
Figure 8:
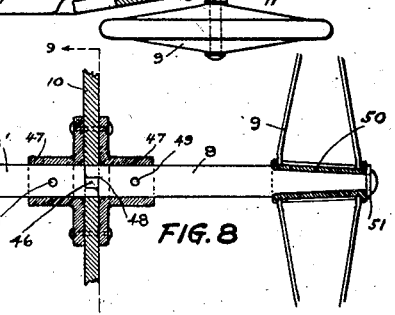

Fig. 8 shows the rear axle arrangement, the sprocket 10 having a hole punched in it, as shown in Figure 9, forming driving keys or projections 46, and having two hubs 47 secured to its sides to form a bore for the shaft. The shaft 8 and 8' is divided in the center and "stepped" as shown at 48 to engage the sprocket projections 46. At 49 are indicated two cotter pins to keep the divided shaft from separating and which may also assist in the driving effort if desired.

The road wheels 9 (a portion of one only being shown in Fig. 8) are preferably forced tightly over a two sided tapered end 50 forming a shoulder on the axle end, and the extreme end of the shaft firmly riveted over against a washer 51 outside of the wheel. This insures that the wheels will never come off of the axle, tho if desired to take a wheel from the vehicle it may be removed complete on its half of the axle.

Of course, if desired a through shaft may be employed, and also only one wheel need be drivingly secured thereto, in the common manner of mounting such wheels on this class of vehicle.

Having thus described my improved velocipede drive and pointed out a few of the modifications possible with it, it will be seen to be capable of considerable changes without affecting the principle involved, therefore I do not wish to restrict myself in the appended claims to specific detail where the improvement is broad, for instance, to any specific form of hooks, or any specific form of chain or driving band.

I claim:

1. A drive chain for a vehicle of the character described comprising alternating block and side links pivotally connected by pintles, hooks projecting from the block links all inclined in a given direction relative to the run of chain.

2. In a vehicle of the class described, a road wheel thereon, a drive sprocket and an endless driving chain looped thereover arranged for driving the wheel, an operating treadle on the vehicle with a portion arranged to travel back and forth in a path adjacent said chain, a device on said treadle adapted to engage the chain during one way direction of the treadle travel only and to pass over said sprocket.

3. A drive chain for a vehicle of the character described comprising alternating block and side links pivotally connected by pintles, hooks projecting one each from one end of the block links and inclined divergingly toward the other end of the block.

4. In a vehicle of the class described, a road wheel thereon, an endless driving band arranged for driving the wheel, a pair of operating treadles on the vehicle with a portion of each arranged to travel back and forth in a path adjacent said band, a device on each treadle adapted to engage the band during one direction of travel of the treadles and to be free of engagement during the other direction of travel.

5. In a vehicle of the class described, a road wheel thereon, an endless loop of chain arranged to drive the wheel, a pair of operating treadles on the vehicle with a portion of each arranged to travel back and forth in a path adjacent said chain, a device on each adapted to independently engage the chain during one direction of travel of the treadles and to be free of engagement therewith during the other direction of travel.

6. In a velocipede having a drive chain, a chain take-up comprising a shaft with a chain wheel thereon, a lever supporting the ends of the shaft and hinged to the vehicle, and means at one end of the lever for adjusting it to displace said wheel in its plane of rotation.

7. In a vehicle of the class described, a foot operated drive embracing upper and lower spaced wheels, an endless power transmitting band passing around said wheels, a pair of treadles on the vehicle adapted to move back and forth adjacent said band, a device on each treadle adapted to independently engage the same band during one way movement of the treadles.

8. In a vehicle of the class described, a foot operated drive embracing a drive sprocket and an idler wheel spaced therefrom, an endless loop of chain passing around said sprocket and idler, a pair of operating treadles independently mounted on the vehicle arranged to move back and forth adjacent the chain, a device on each treadle adapted to engage the same chain during one way movement of the treadles, said devices being independent of one another and adapted to pass one another during the non-engaging stroke of the treadles.

9. In a vehicle of the class described, a foot operated drive embracing a drive sprocket and an idler wheel spaced therefrom, an endless loop of drive chain passing around said sprocket and idler, a pair of operating treadles independently mounted on the vehicle with a portion of each arranged to move back and forth adjacent the chain, an open hook on each treadle arranged to hook the chain during the movement of the treadles in one direction and to be free of the chain during the other way movement of the treadles, said hooks being adapted to pass one another during independent operation of the treadles.

10. In a vehicle of the class described, a foot operated rear axle drive embracing upper and lower wheels, an endless band passing over said wheels, a treadle adapted to move adjacent said band, a device on the treadle adapted to engage the band during one way movement of the treadle, said treadle having a length of travel sufficient to pass said device beyond the center of each wheel.

11. In a vehicle of the class described, a foot operated drive embracing a drive sprocket and an idler spaced therefrom, an endless loop of drive chain passing over said sprocket and idler, an operating treadle on said vehicle adapted to move back and forth adjacent said chain, a device on the treadle adapted to engage the chain during one way movement of the treadle, said treadle having a length of travel sufficient to carry said device beyond the center of the sprocket and idler and out of engagement with the chain at both ends of the stroke.

12. In a vehicle of the class described, a foot operated drive embracing a drive sprocket and an idler in spaced relation, an endless loop of drive chain passing over said sprocket and idler, an operating treadle on said vehicle adapted to move back and forth adjacent said chain, an open hook on said treadle adapted to hook the chain upon one way movement of the treadle only, said treadle having a length of travel sufficient to carry the hook beyond the centers of the sprocket and idler end passing it out of engagement with the chain.

13. In a vehicle of the class described embracing an endless band chain drive, an operating treadle adapted to oscillate adjacent said chain, a hook on the treadle adapted to hook the chain at one way of oscillation only, and to pass out of engagement with the chain at the end of the stroke.

14. In a vehicle of the class described, a foot operated drive embracing an endless loop of chain arranged to transmit power to a road wheel of the vehicle, a pair of operating treadles on the vehicle with a portion of each arranged to travel back and forth in a path adjacent said chain, a hook on each treadle each adapted to independently hook the chain during one direction of travel of the treadles and to disengage the chain during the reverse movement of the treadle.

15. In a vehicle of the class described, a road wheel, a loop of driving chain with a sprocket at one end of the loop arranged for driving the wheel, an idler at the other end of the loop, a treadle on the vehicle with a portion arranged to move back and forth in a path along said chain, a hook co-operating with the treadle adapted to hook the chain during one way movement only of the treadle, and means for resiliently holding the hook against the chain.

16. In a vehicle of the class described, a foot operated drive embracing an endless loop of drive chain passing over an idler, a treadle, means operated by the treadle for pulling the chain, and automatic means for moving the idler to tension the loop.

17. In a vehicle of the character described including a horizontally arranged frame, a longitudinally arranged operating treadle pivoted to the forward end of the vehicle, a brace at the forward end of the vehicle extending at an angle from the frame, and a stop on said brace for limiting the upward movement of the treadle.

18. In a vehicle of the character described, a horizontally disposed main frame, a steering head at the forward end of said frame, a pair of longitudinally arranged operating treadles pivoted transversely to the forward end of the vehicle, an angular brace extending from the steering head between the treadles to the main frame, and a stop piece on said brace adapted to limit the upward travel of said treadles.

19. In a vehicle of the character described, a longitudinally arranged operating treadle pivoted transversely to the front end of the vehicle, said treadle comprising a substantially flat foot board with an upwardly extending bracket secured thereto at the forward end of the board and engaging the pivot.

20. In a vehicle of the class described, an endless chain drive, a treadle with a hook adapted to engage said chain upon movement of the treadle, and resilient means co-operating with the hook to minimize the impact of the engagement.

21. In a vehicle of the class described, an endless chain drive, a treadle with a hook adapted to hook said chain upon one way movement of the treadle, and a spring between said hook and said treadle arranged to modify the impact of the hooking engagement.

22. In a vehicle of the class described, a base board frame, a steering bracket secured to the same at the forward end and pivoted to the steering post, a transverse pivot on the bracket, a longitudinally arranged operating treadle supported on the pivot for oscillation, and a spring on the bracket reacting against same and the treadle for raising the latter.

23. In a vehicle of the class described, a base board frame, a steering bracket secured to the same at the forward end, a transverse shaft carried by the bracket, a pair of longitudinally arranged operating treadles pivoted at their forward ends on said shaft, a wire spring arranged on the bracket with its free ends each, respectively, against one of the treadles to lift the rear end thereof.

24. In a vehicle of the class described, a base board frame, two upstanding sides secured to the rear end thereof and diverging forwardly, a rear shaft passing transversely across the vehicle through said sides, bearing alining brackets secured to said sides, and bearings for the shaft supported in the brackets.

25. In a vehicle of the class described, a frame, two rear wheels thereon, a divided shaft connecting said wheels, and a driving sprocket with a hub straddling the division of the shaft and alining the ends thereof.

26. In a vehicle of the class described, a frame, two rear wheels thereon, a divided shaft connecting said wheels, a driving sprocket with a double ended hub on said shaft straddling the division and alining the ends, driving means for said sprocket centralized within the hub, the inner ends of the divided shaft being arranged to engage with said driving means when in position within the hub, and means passing through the ends of the hub for holding the shaft ends therein.

SAMUEL L. ROGERS.